UNITED STATES PATENT OFFICE.

WALTER B. PRICE, OF SAN FRANCISCO, CALIFORNIA.

METHOD OF PURIFICATION OF MINERAL OILS.

SPECIFICATION forming part of Letters Patent No. 548,391, dated October 22, 1895.

Application filed July 27, 1894. Serial No. 518,734. (No specimens.)

*To all whom it may concern:*

Be it known that I, WALTER B. PRICE, a citizen of the United States, residing at San Francisco, county of San Francisco, and State of California, have invented a new and useful Improvement in Methods of Purification of Illuminating-Oils, of which the following is a full, clear, and exact description, reference being had to the accompanying drawing, which forms a part of this specification.

In the process of purification of illuminating-oils as ordinarily carried out the illuminating-oils are treated with oil of vitriol (sulphuric acid) at a temperature of about 60° Fahrenheit. The acid sludge, consisting of the oil of vitriol, combined with the impurities of the oil and forming a black, tarry product, settles at the bottom of the agitator and is drawn off. The oil is then agitated with an alkali solution and finally washed with water.

In the practice as generally carried out the attempt is made to keep the temperature of the oil as near 60° as possible. I have attempted to purify certain oils, particularly the oils found in California, by this process, and I find that it is impossible to properly purify and make them suitable for illuminating purposes in that manner, and I have discovered that if, instead of treating the oils with sulphuric acid at a low temperature, as is the common practice, I treat the oils with sulphuric acid at a high temperature (and in my practice I have used a temperature of from about 212° to 250° Fahrenheit) I can obtain a good burning oil from the crude.

In carrying out my process I first heat the oil to a temperature of about 250° Fahrenheit and then add the sulphuric acid, and the mixture is agitated. If the sulphuric acid has previously been heated, it is not necessary to heat the oil so high; but if the acid is added in the cold state then the oil must be heated higher, so as to bring the acid up to the proper temperature. After the agitation the sludge is drawn off and the oil washed to free it from all the acid possible. The oil is discolored by treating with the hot acid, so it is necessary to distill it to free it from the acid compounds and make it a commercial product. This is done in an ordinary still in the regular way.

Having now fully described my invention, what I claim, and desire to protect by Letters Patent, is—

1. The hereinbefore described improvement in the process of purifying California illuminating oils, which consists in treating the oil to be purified with strong sulphuric acid, at a temperature above the boiling point of water.

2. The hereinbefore described improvement in the treatment of California oils which consists in heating the oil to be treated to the boiling point of water and then agitating said oil so heated with strong sulphuric acid heated to, at, or about the same temperature.

3. The hereinbefore described method of purifying California illuminating oil, which consists in agitating the oil with strong sulphuric acid at a temperature at or above the boiling point of water.

4. The hereinbefore described improvement in the process of purifying California illuminating oil, which consists in heating the oil to a temperature at or above the boiling point of water, then agitating said oil so heated with strong sulphuric acid which has been heated to, at, or about the same temperature.

In testimony of which invention I have hereunto set my hand.

WALTER B. PRICE.

Witnesses:
C. N. FELTON, Jr.,
CHAS. B. WHEATON.